US006647819B1

United States Patent
Chang

(10) Patent No.: US 6,647,819 B1
(45) Date of Patent: Nov. 18, 2003

(54) TRANSMISSION ASSEMBLY FOR A CEILING-MOUNTED TV SUPPORT

(75) Inventor: Steven Chang, Chung Ho (TW)

(73) Assignee: Punch Video, Inc., Taipei Hsien (TW)

( * ) Notice: Subject to any disclaimer, the term of this patent is extended or adjusted under 35 U.S.C. 154(b) by 381 days.

(21) Appl. No.: 09/694,591

(22) Filed: Oct. 23, 2000

(51) Int. Cl.$^7$ ............................ F16H 57/00; B60Q 1/00
(52) U.S. Cl. ........................ 74/421 A; 74/411; 74/420; 74/425
(58) Field of Search ........................ 74/405, 411, 416, 74/417, 420, 421 A, 423, 425, 412 R; 348/837

(56) References Cited

U.S. PATENT DOCUMENTS 4,770,055 A * 9/1988 Chevance et al. ............ 74/411
4,796,479 A * 1/1989 Wisecarver .................. 74/398
6,529,123 B1 * 2/2003 Paul, Jr. ..................... 340/425.5

* cited by examiner

Primary Examiner—William C Joyce
(74) Attorney, Agent, or Firm—Thorp Reed & Armstrong, LLP

(57) ABSTRACT

A transmission assembly for a ceiling-mounted TV in a vehicle has a series of gears mutually mated with each other so as to move the moving plate with respect of the fixing plate of the support. A biasing spring is added in between the series of gears so as to enable the transmission to be disengaged when the moving plate reaches a predetermined angle. A memory device is added to the transmission assembly to register the rotation angle of the moving plate and to shut down the power to the transmission assembly when the moving plate reaches a predetermined angle.

3 Claims, 6 Drawing Sheets

TRANSMISSION ASSEMBLY FOR A CEILING-MOUNTED TV SUPPORT

BACKGROUND OF THE INVENTION

1. Field of the Invention

The present invention relates to a ceiling-mounted TV support, and more particularly to a transmission assembly for a ceiling-mounted TV support. The transmission assembly has a gear assembly securely provided on a fixing plate attached to a rooftop and driven by a motor, a first guiding gear mated with a second guiding gear rotatably mounted on a moving plate with an LCD screen and a memory chip mounted by the gear assembly to store in a memory the rotation angle of a second gear of the gear assembly to automatically shut off the power to the motor when the screen is in position.

2. Description of Related Art

With the introduction of Recreation Vehicles (RV), people have become more and more interested in ways to spend their leisure time. People do not want any stress or trouble in their holidays, so everything involved in the holidays should be easy to operate and trouble-free. One of the luxury items that goes with the RV is the TV set. The TV set normally is mounted in the ceiling of the RV and can not be adjusted according to different requirements. Therefore, users will have to adjust themselves to the angle of the TV set, which is quite troublesome. Moreover, even when the angle of the TV set is adjustable, users still have to gradually adjust the angle manually for viewing in the most comfortable posture. To overcome the aforementioned problems, a transmission assembly is introduced into the market to save the viewers the trouble arising from adjustment. The transmission assembly mounted on a bottom plate (70), as shown in FIG. 6, has a motor (71), a gear assembly and a rack (60).

The motor (71) has a worm (not shown) connected with a worm gear (73). The gear assembly has a first transmission gear (74) fitted beneath the worm gear (73), an axis (75) extending through the worm gear (73) and the first transmission gear (74), a second transmission gear (76) mated with the first transmission gear (74), a third transmission gear (77) securely engaged with the second transmission gear (76) and a fourth transmission gear (78) mated with the third transmission gear (77). Due to the mutual relationships of the gear assembly, the driving force from the motor (71) is able to drive the rack (60) to thus move the LCD screen to a predetermined angle.

This kind of arrangement does have the effect to control the movement of the LCD screen, however, when the LCD screen reaches its predetermined angle, the motor (71) still outputs power to the gear assembly and accordingly to the rack (60), which will eventually damage the gear assembly. Although this kind of transmission assembly is able to move the LCD screen, the user still needs to manually adjust the angle of the TV every time for the most comfortable posture for watching the TV.

To overcome the shortcomings, the present invention tends to provide an improved transmission assembly for a ceiling-mounted TV support to mitigate and obviate the aforementioned problems.

SUMMARY OF THE INVENTION

The main objective of the invention is to provide an improved transmission assembly having a safety device provided in a gear assembly of the transmission to prevent damage to the gear assembly.

Another objective of the invention is to provide a first guiding gear rotatably mounted on a fixing plate and a second guiding gear rotatably mounted on a moving plate and mated with the first guiding gear. The first guiding gear and the second guiding gear are so mated that the movement of the moving plate is able to be controlled precisely.

Still, another objective of the invention is to provide a memory chip mounted beside the gear assembly for sensing the rotation angle of the gear assembly to automatically shut off the power to the motor.

Other objects, advantages and novel features of the invention will become more apparent from the following detailed description when taken in conjunction with the accompanying drawings.

DETAILED DESCRIPTION OF PREFERRED EMBODIMENT

Figure 1:
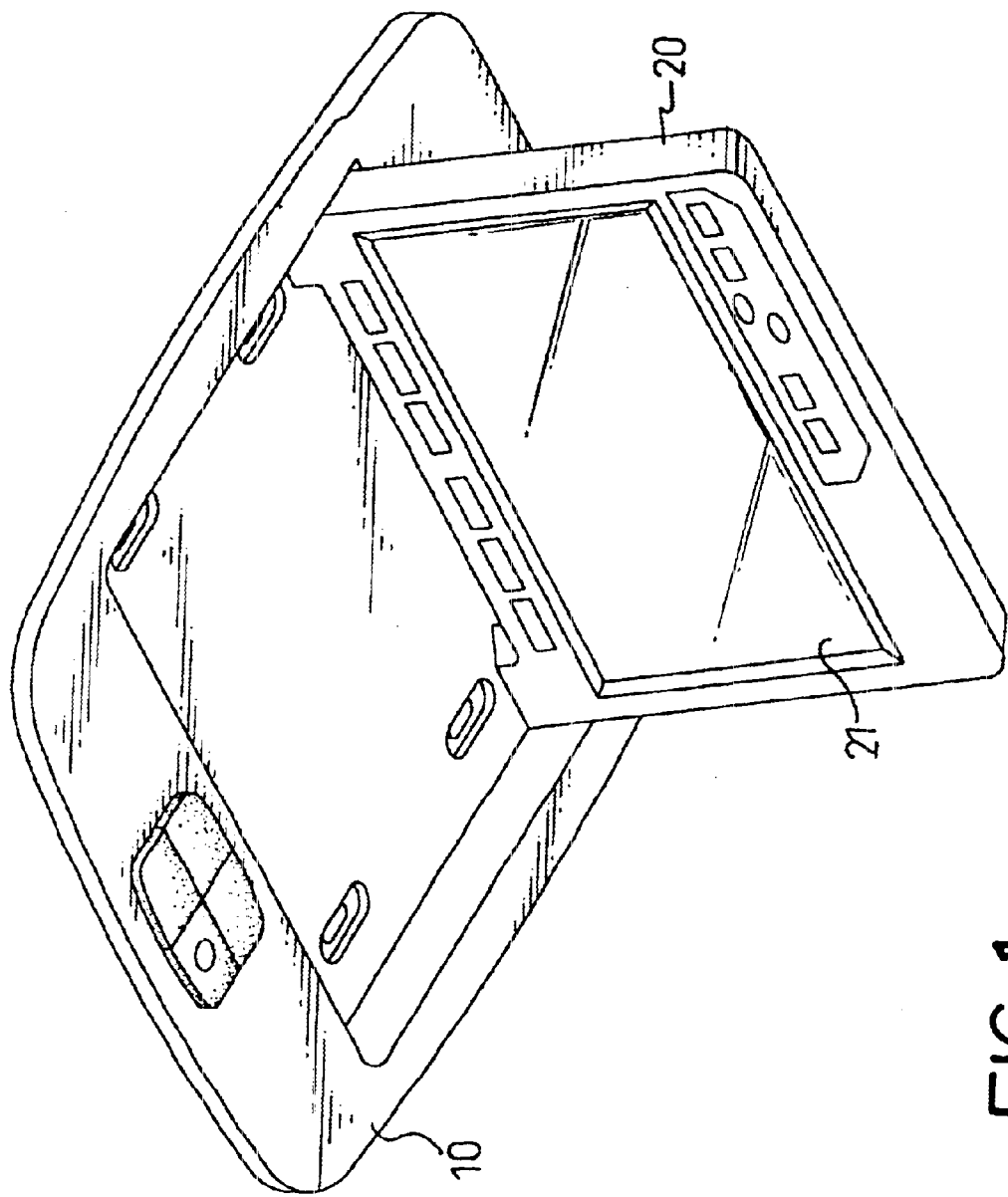
FIG. 1 is a perspective view of a ceiling-mounted TV support driven by the transmission assembly in accordance with the present invention.
Figure 2:
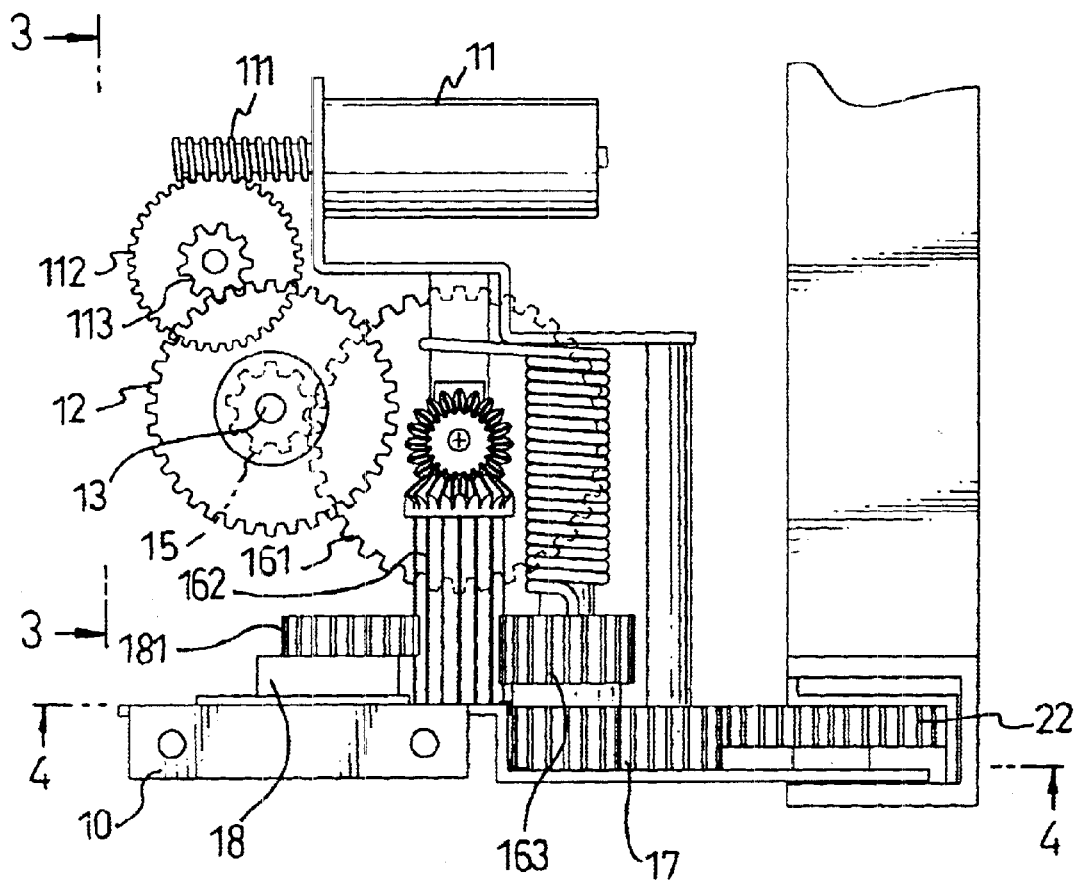
FIG. 2 is a top plan view showing the arrangement of the transmission assembly of the invention.
Figure 3:
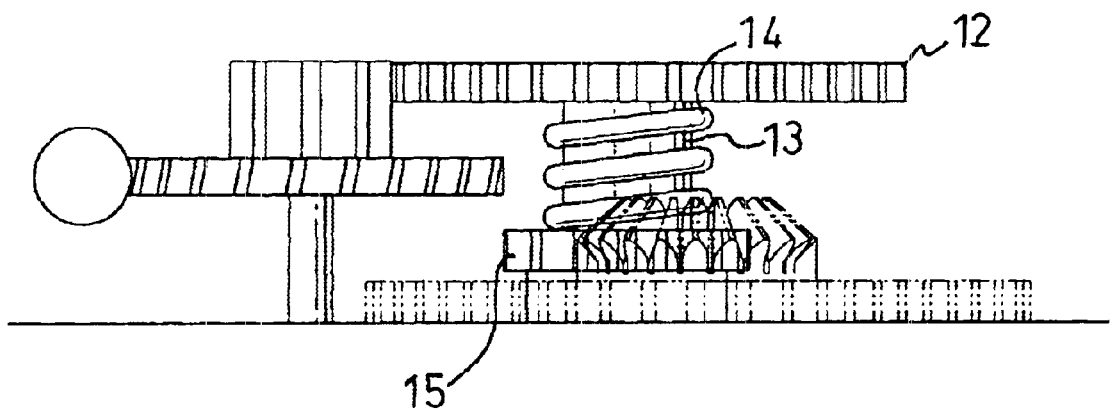
FIG. 3 is a side view in section taking the line 3—3 of FIG. 2.
Figure 4:
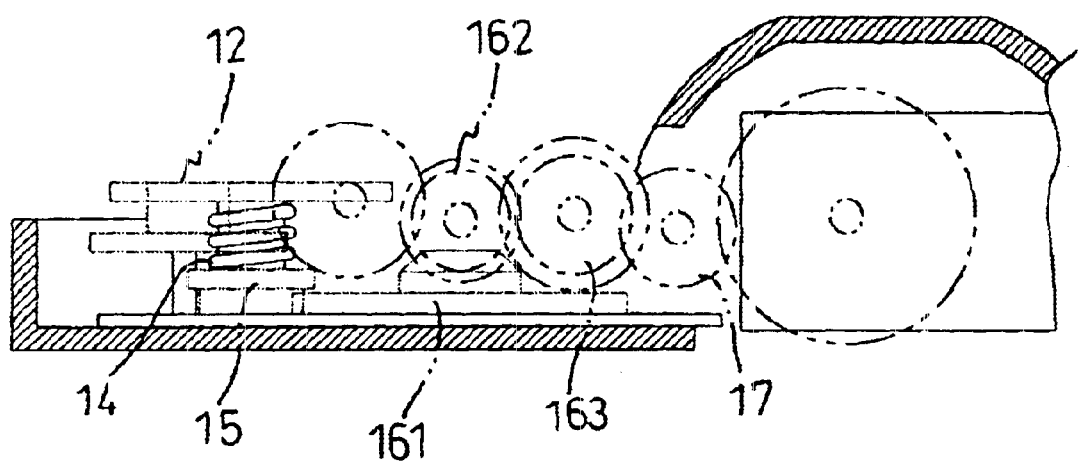
FIG. 4 is a side view in section taking the line 4—4 of FIG. 2.
Figure 5:
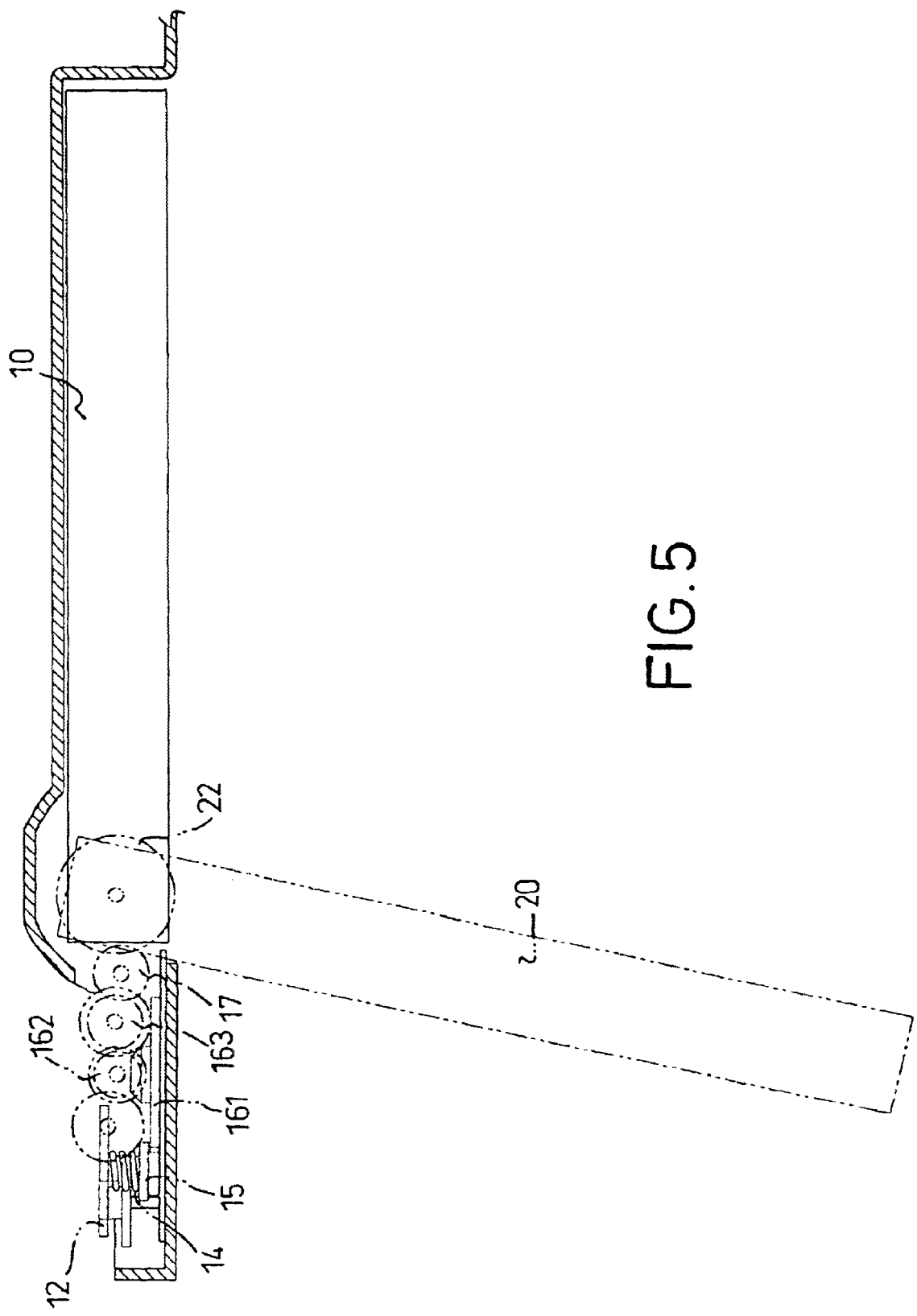
FIG. 5 is a schematic view showing the moving plate is moved by the transmission assembly of the invention.
Figure 6:
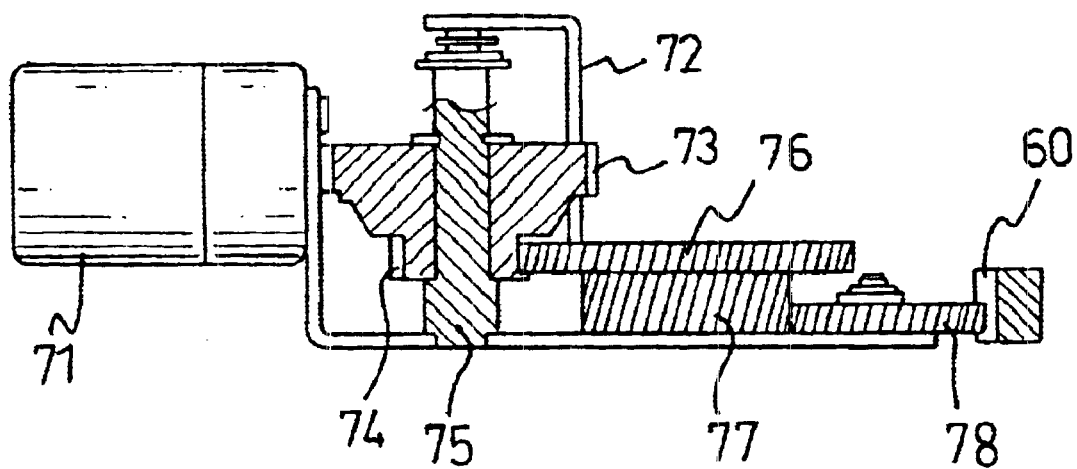
FIG. 6 is a side plan view in partial cross section of a conventional transmission assembly of a ceiling-mounted TV support.

With reference to FIG. 1, a ceiling-mounted TV support has a fixing plate (10) securely adapted to a ceiling of a vehicle such as an RV, and a moving plate (20) pivotally connected with the fixing plate (10) and provided with a liquid crystal display (LCD) (21) which functions as a screen for TV, video, DVD programs etc. The moving plate (20) is able to move with the assistance of the transmission assembly of the invention relative to the fixing plate (10), such that the angle of the LCD (21) is able to be adjusted according to different users' requirements.

With reference to FIGS. 2, 3, 4 and 5, the transmission assembly of the invention has a motor (11) with a worm (111), a worm gear (112) mated with the worm (111) and having a small gear (113) integrally formed on top of the worm gear (112), a drive gear (12) mated with the small gear (113) and having a rod (13) extending through the center of the drive gear (12), a biasing spring (14) mounted around the rod (13), a control gear (15) sandwiching the biasing spring (14) with the drive gear (12), a first transmission gear (161) mated with the control gear (15), a second transmission gear (162) mated with the first transmission gear (161) and a third transmission gear (163) mated with the second transmission gear (162). With such an arrangement, the rotation from the motor (11) will be transmitted to the third transmission gear (163) by means of the mutual relationships between the parts of the transmission assembly. Beside the parts above, the transmission assembly of the invention further has a first guiding gear (17) mated with the third transmission gear (163) and a second guiding gear (22) mated with the first guiding gear (17). Because the first guiding gear (17) is rotatably mounted on the fixing plate (10) and the second guiding gear (22) is rotatably mounted on the moving plate (20), the rotation of the first guiding gear (17) will move the moving plate (20).

To avoid damage to the transmission assembly caused by the idle rotation of the motor (11), the moving plate (20) reaches its predetermined angle, the spring (14) is sandwiched between the drive gear (12) and the control gear (15) and bias each other to ensure the transmission of the rotation from the drive gear (12) to the control gear (15). However, when the moving plate (20) reaches its predetermined angle, the rotation of the drive gear (12) transmitted from the motor (11) will overcome the biasing force from the spring (14) and thus the rotation of the drive gear (12) will not transmit to the control gear (15). Because the control gear (15) does not rotate any more, the resulting gears will not be damaged.

Furthermore, the transmission assembly of the invention has a memory device (18), preferably composed of a sensor and a memory, with a gear (181) mated with the second transmission gear (162). When the motor (11) starts rotating the worm gear (112), before the moving plate (20) reaches its predetermined angle, the rotation of the worm gear (112) will rotate the second transmission gear (162) as well, which will rotate the gear (181). When the gear (181) rotates, the memory device (18) will start to process and register the rotation angle of the gear (181). When the second transmission gear (162) stops rotating, which stops the rotation of the gear (181), the memory device (18) will register the total rotation angle of the gear (181). Thus, the next time when the user turns on the power of the motor (11), the power of the motor (11) will be automatically shut off by the memory device (18) after the rotation angle of the gear (181) registered in the memory device (18) is reached. With the addition of the memory device (18), the user will not need to make the adjustment from different watching angles relative to the predetermined angle.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A transmission assembly adapted to drive a ceiling-mounted TV support having a fixing plate and a moving plate provided with a display, the transmission assembly comprising:

a motor (11) with a worm (111) and a worm gear (112) mated with the worm (111) and having a small gear (113) integrally formed on top of the worm gear (112);

a drive gear (12) mated with the small gear (113) and having a rod (13) extending through the center of the drive gear (12);

a biasing spring (14) mounted around the rod (13);

a control gear (15) sandwiching the biasing spring (14) with the drive gear (12);

a first transmission gear (161) mated with the control gear (15);

a second transmission gear (162) mated with the first transmission gear (161);

a third transmission gear (163) mated with the second transmission gear (162);

a first guiding gear (17) adapted to be rotatably mounted on the fixing plate and being mated with the third transmission gear (163); and a second guiding gear (22) mounted on the moving plate and being mated with the first guiding gear (17);

wherein the biasing force of the biasing spring (14) between the control gear and the drive gear is able to be released so as to disengage the rotation between the drive gear and the control gear.

2. The transmission assembly as claimed in claim 1 further comprising a memory device supported on the fixing plate and having a gear rotatably mated with the second transmission gear.

3. The transmission assembly as claimed in claim 2, wherein the memory device is composed of a sensor for counting the rotational angle of the gear and a memory for recording the rotation angle of the gear after the gear stops and shutting down the power to the motor.

* * * * *